United States Patent
Hui et al.

(10) Patent No.: US 9,112,805 B2
(45) Date of Patent: Aug. 18, 2015

(54) ROUTING MESSAGES IN A COMPUTER NETWORK USING DETERMINISTIC AND PROBABILISTIC SOURCE ROUTES

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 140 days.

(21) Appl. No.: 13/631,064

(22) Filed: Sep. 28, 2012

(65) Prior Publication Data

US 2014/0092905 A1    Apr. 3, 2014

(51) Int. Cl.
*H04L 12/721* (2013.01)

(52) U.S. Cl.
CPC ...................................... *H04L 45/34* (2013.01)

(58) Field of Classification Search
CPC ............ G06F 13/4022; G06F 15/7867; G06F 17/5077; G06G 1/0104; H04L 45/00; H04L 45/02; H04L 45/04; H04L 45/12; H04L 45/16; H04L 45/34
See application file for complete search history.

(56) References Cited

U.S. PATENT DOCUMENTS

| | | |
|---|---|---|
| 6,850,518 B1 | 2/2005 | Khanna |
| 7,596,097 B1 | 9/2009 | McCowan et al. |
| 7,599,303 B2 | 10/2009 | Nadeau et al. |
| 8,233,388 B2 | 7/2012 | Zheng et al. |
| 2007/0153737 A1* | 7/2007 | Singh et al. .................. 370/331 |
| 2011/0149973 A1* | 6/2011 | Esteve Rothenberg et al. ............................. 370/392 |
| 2012/0300781 A1* | 11/2012 | Sarela et al. .................. 370/392 |
| 2012/0307652 A1 | 12/2012 | Vasseur et al. |

OTHER PUBLICATIONS

Castelluccia, C., "Hash-Based Dynamic Source Routing (HB-DSR)", Rapport de Recherche, Mar. 2003, No. 4784, 21 pages, INRIA, Montbonnot-St-Martin, France.

Jokela, et al., "LIPSIN: Line Speed Publish/Subscribe Inter-Networking", SIGCOMM '09, Aug. 2009, pp. 195-206, Barcelona, Spain.

Thubert, P., "Objective Function Zero for the Routing Protocol for Low-Power and Lossy Networks (RPL)", Request for Comments 6552, Mar. 2012, 14 pages, Internet Engineering Task Force Trust.

Vasseur, et al., "Routing Metrics Used for Path Calculation in Low Power and Lossy Networks" <draft-ietf-roll-routing-metrics-12, IETF Trust, Network Working Group, Internet Draft, Nov. 2010, pp. 1-31.

Winter, et al., "RPL: IPv6 Routing Protocol for Low-Power and Lossy Networks", Request for Comments 6550, Mar. 2012, 157 pages, Internet Engineering Task Force Trust.

* cited by examiner

*Primary Examiner* — Yong Zhou
(74) *Attorney, Agent, or Firm* — Parker Ibrahim & Berg LLC; James M. Behmke; Stephen D. LeBarron

(57) ABSTRACT

In one embodiment, a data packet message is provided which includes a routing header configured to accommodate both a deterministic source route and a probabilistic source route for encoding a nodal source route. The nodal source route is selectively encoded with one or both of a deterministic source route and a probabilistic source route based upon one or more predetermined criteria.

19 Claims, 6 Drawing Sheets

ROUTING MESSAGES IN A COMPUTER NETWORK USING DETERMINISTIC AND PROBABILISTIC SOURCE ROUTES

TECHNICAL FIELD

The present disclosure relates generally to computer networks, and, more particularly, to routing messages in a computer network using deterministic and probabilistic source routes.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG) in addition to a set of features to bound control traffic, support local (and slow) repair, etc. The RPL routing protocol provides a flexible method by which each node performs DODAG discovery, construction, and maintenance.

One problem that confronts LLNs is the relative large size of RPL control messages. One reason why RPL control messages are large is because they often contain full IPv6 addresses, which are typically large in size. It is noted that RPL control messages use DAO messages to install downward routes, and in a non-storing mode, the DAO message typically contains one or more RPL Transit Information Options that indicate the full IPv6 addresses of the DAG parents of the source. To process links having time-varying link qualities, a typical RPL implementation involves having each RPL router maintain multiple DAG parents. Thus, having more parents increases the robustness to any link failures that may occur. Unfortunately, the number of parents directly affects the size of each DAO message. For instance, a RPL control message typically requires 22 bytes for each Transit Information Option (16 bytes of which is attributable to the IPv6 address), which has proven to be large and is disadvantageous since it creates unwanted overhead in communication schemes.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
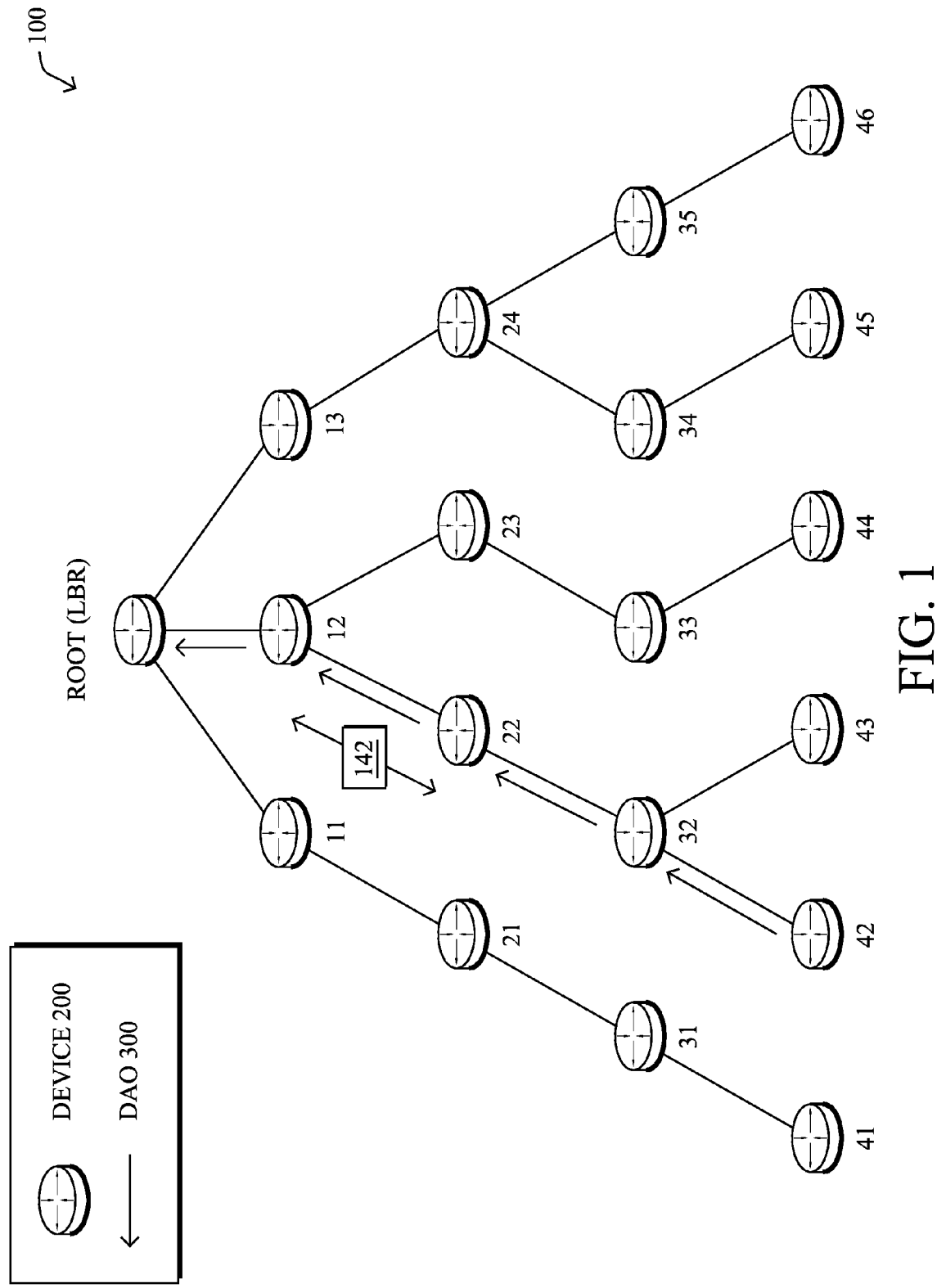
FIG. 1 illustrates an example computer network and a directed acyclic graph (DAG)

According to one or more embodiments, a data packet message is provided which includes a routing header configured to accommodate both a deterministic source route and a probabilistic source route for encoding a nodal source route. The nodal source route is selectively encoded with one or both of a deterministic source route and a probabilistic source route based upon one or more predetermined criteria.

In another embodiment, a data packet message is provided in a computer network for transmission across a nodal signal path. The data packet message has a routing header configured to accommodate both a deterministic source route and a probabilistic source route for encoding a nodal source route. When the data packet message transmits along the nodal source path, and in response to the data packet message not having a deterministic source route, the probabilistic source route is interpolated and the message is forwarded along the nodal source path based on the interpolation. In the event a deterministic source route is present, the probabilistic source route may nevertheless be utilized for forwarding the message based upon the determination of prescribed criteria.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, WPC and others. In addition, a Mobile Ad-Hoc Network (MANET) is a type of wireless ad-hoc network, which is generally considered a self-configuring network of mobile routes (and associated hosts) connected by wireless links, the union of which forms an arbitrary topology.

Smart object networks, such as sensor networks in particular, are a specific type of network consisting of spatially distributed autonomous devices such as sensors that cooperatively monitor physical or environmental conditions at different locations, such as, e.g., temperature, pressure, vibration, sound, radiation, motion, pollutants, etc. Other types of smart objects include actuators, e.g., objects responsible for turning on/off an engine or performing other actions. Sensor networks are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode,"

the sensors transmit their data to the sensor sink/subscriber without prompting, e.g., at a regular interval/frequency or in response to external triggers. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

FIG. 1 is a schematic block diagram of an example computer network 100 illustratively comprising nodes/devices 200, such as, e.g., routers, sensors, computers, etc., interconnected by various methods of communication (e.g., and labeled as shown, "LBR," "11," "12," ... "46"). For instance, the links of the computer network may be wired links or may comprise a wireless communication medium, where certain nodes 200 of the network may be in communication with other nodes 200, e.g., based on distance, signal strength, current operational status, location, etc. Those skilled in the art will understand that any number of nodes, devices, links, etc. may be used in the computer network, and that the view shown herein is for simplicity. Illustratively, certain devices in the network may be more capable than others, such as those devices having larger memories, sustainable non-battery power supplies, etc., versus those devices having minimal memory, battery power, etc. For instance certain devices 200 may have no or limited memory capability. Also, one or more of the devices 200 may be considered "root nodes/devices" (or root capable devices) while one or more of the devices may also be considered "destination nodes/devices."

Data packet messages 140 (e.g., traffic and/or messages sent between the devices/nodes) may be exchanged among the nodes/devices of the computer network 100 using predefined network communication protocols such as the Transmission Control Protocol/Internet Protocol (TCP/IP), User Datagram Protocol (UDP), Multi-Protocol Label Switching (MPLS), various proprietary protocols, etc. In this context, a protocol consists of a set of rules defining how the nodes interact with each other. In addition, packets within the network 100 may be transmitted in a different manner depending upon device capabilities, such as source routed packets.

Figure 2:
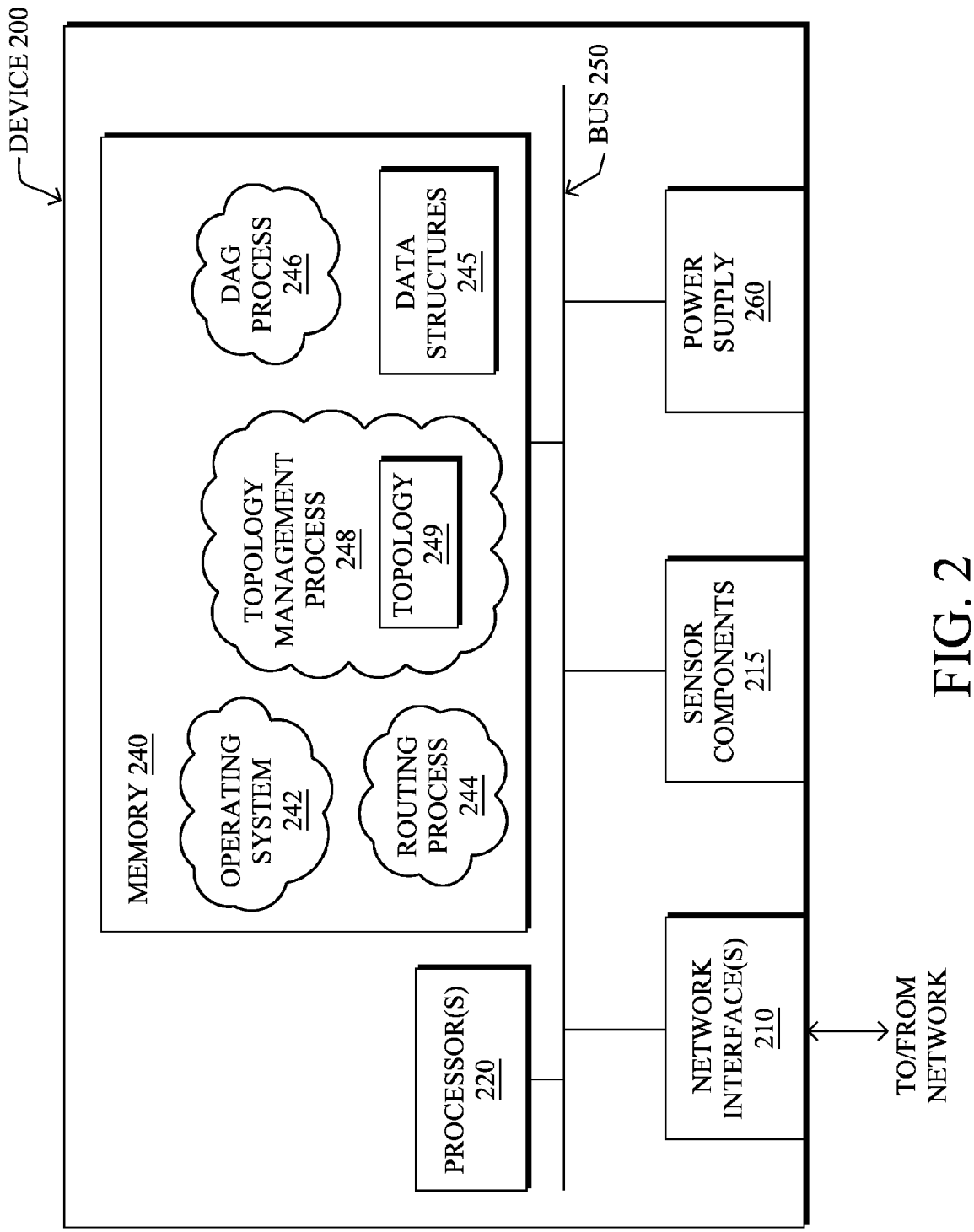
FIG. 2 illustrates an example network device/node.

FIG. 2 is a schematic block diagram of an example node/device 200 that may be used with one or more embodiments described herein, e.g., as a root node or sensor. The device may comprise one or more network interfaces 210, one or more sensor components 215 (e.g., sensors, actuators, etc.), a power supply 260 (e.g., battery, plug-in, etc.), one or more processors 220 (e.g., 8-64 bit microcontrollers), and a memory 240 interconnected by a system bus 250. The network interface(s) 210 contain the mechanical, electrical, and signaling circuitry for communicating data over physical and/or wireless links coupled to the network 100. The network interface(s) may be configured to transmit and/or receive data using a variety of different communication protocols, including, inter alia, TCP/IP, UDP, wireless protocols (e.g., IEEE Std. 802.15.4, WiFi, Bluetooth (Registered trademark), Ethernet, powerline communication (PLC) protocols, etc.

The memory 240 comprises a plurality of storage locations that are addressable by the processor(s) 220 and the network interface(s) 210 for storing software programs and data structures associated with the embodiments described herein. As noted above, certain devices may have limited memory or no memory (e.g., no memory for storage other than for programs/processes operating on the device). The processor(s) 220 may comprise necessary elements or logic adapted to execute the software programs and manipulate the data structures, such as routes or prefixes of a routing/forwarding table 245 (notably on capable devices only). An operating system 242, portions of which are typically resident in memory 240 and executed by the processor(s), functionally organizes the device by, inter alia, invoking operations in support of software processes and/or services executing on the device. These software processes and/or services may comprise routing process/services 244, which may include an illustrative directed acyclic graph (DAG) process 246. Also, for root devices (or other management devices), a topology management process 248 and associated stored topologies 249 may be present in memory 240, for use as described herein. It will be apparent to those skilled in the art that other processor and memory types, including various computer-readable media, may be used to store and execute program instructions pertaining to the techniques described herein. Also, while the description illustrates various processes, it is expressly contemplated that the various processes may be embodied as modules configured to operate in accordance with the techniques herein (e.g., according to the functionality of a similar process).

Routing process (services) 244 contains computer executable instructions executed by the processor(s) 220 to perform functions provided by one or more routing protocols, such as proactive or reactive routing protocols as will be understood by those skilled in the art. These functions may, on capable devices, be configured to manage routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can direct the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) A number of use cases require specifying a set of link and node metrics, some of them being dynamic, thus requiring specific smoothing functions to avoid routing instability, considerably draining bandwidth and energy;

4) Constraint-routing may be required by some applications, e.g., to establish routing paths that avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnects are constrained; LLN routers typically operate with constraints, e.g., processing power, memory, and/or energy (battery), and their interconnects are characterized by, illustratively, high loss rates, low data rates, and/or instability. The LLN may be sized with devices ranging from a few dozen to as many as thousands or even millions of LLN routers, and may support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc.

A DAG is a directed graph that represents a computer network, such as computer network 100, and that has the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or, as used herein, one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG. Also, the routing protocol allows for including an optional set of constraints to compute a constrained path, such as where if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, estimated transmission count (ETX), etc., while example constraints that may be placed on the route selection may comprise various reliability thresholds, restrictions on battery operation, multipath diversity, load balancing requirements, bandwidth requirements, transmission types (e.g., wired, wireless, etc.), and also a number of selected parents (e.g., single parent trees or multi-parent DAGs). Notably, an example for how routing metrics may be obtained may be found in an IETF Internet Draft, entitled "Routing Metrics used for Path Calculation in Low Power and Lossy Networks"<draft-ietf-roll-routing-metrics-12> by Vasseur, et al. (Nov. 10, 2010 version). Further, an example OF (e.g., a default OF) may be found in an IETF RFC, entitled "RPL Objective Function 0" <RFC 6552> by Thubert (March 2012 version).

Building of a DAG may utilize a discovery mechanism to build a logical representation of the network, and route dissemination to establish state within the network so that routers know how to forward packets toward their ultimate destinations. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going against the orientation of the edges within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward (UP) direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root which can, in turn, build the topology and locally compute downward routes to all nodes in the DODAG. Such nodes are then reachable using source routing techniques over regions of the DAG that are incapable of storing downward routing state.

Figure 3:
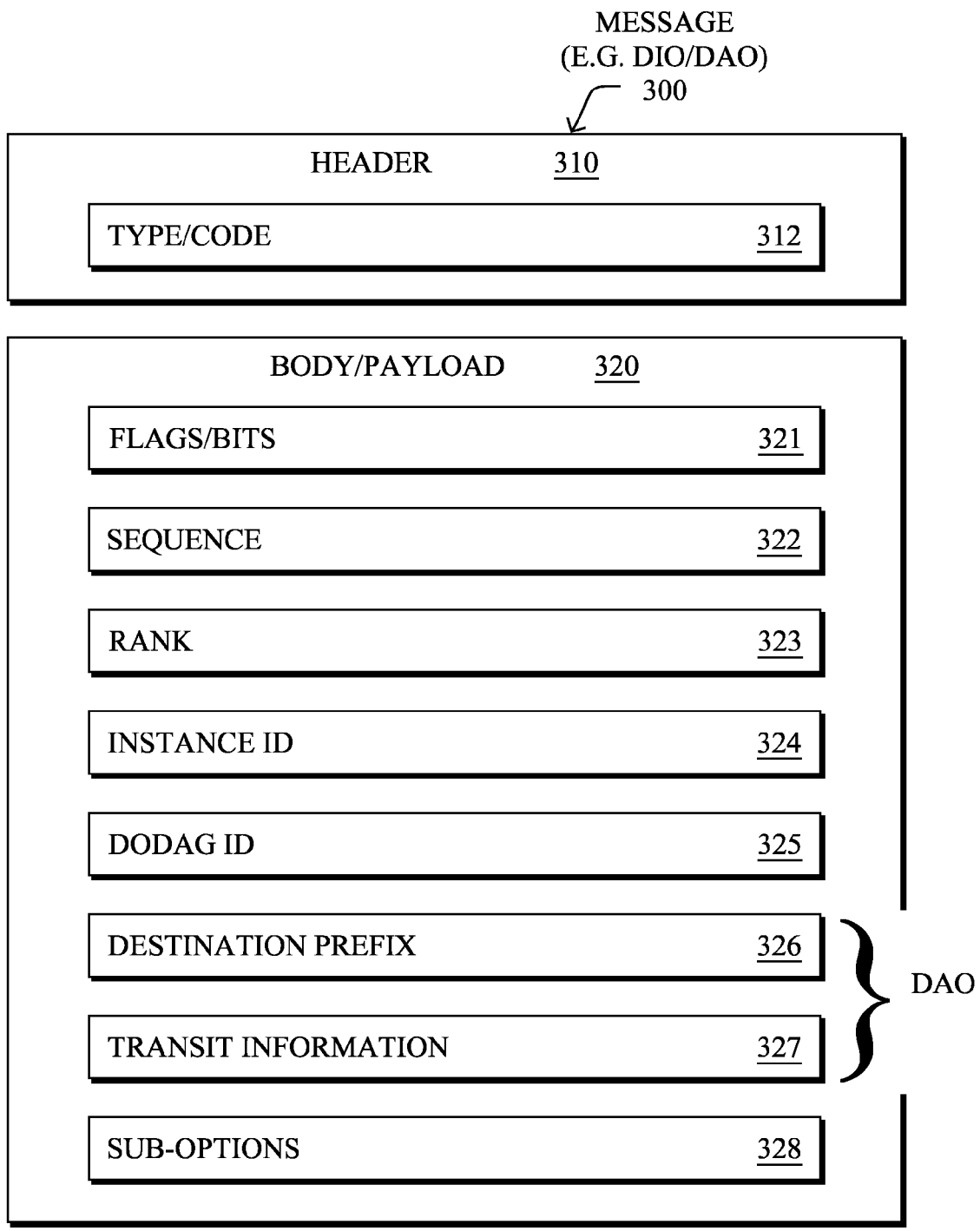
FIG. 3 illustrates an example message.

FIG. 3 illustrates an example DAO message 300 with a simplified control message format that may be used for discovery and route dissemination when building a DAG, e.g., as a DIO or DAO. Message 300 illustratively comprises a header 310 having one or more fields 312 that identify the type of message (e.g., a RPL control message) and a specific code indicating the specific type of message, e.g., a DIO or a DAO (or a DAG Information Solicitation). A body/payload 320 of the message may comprise a plurality of fields used to relay pertinent information. In particular, the fields may comprise various flags/bits 321, a sequence number 322, a rank value 323, an instance ID 324, a (DO)DAG ID 325, and other fields, each as may be appreciated in more detail by those skilled in the art. Further, for DAO messages, fields for a destination prefix 326 and a reverse route stack 327 may also be included. For either DIOs or DAOs, one or more additional sub-option fields 328 may be used to supply additional or custom information (such as, e.g., the VGF) within the message 300. For instance, an objective code point (OCP) sub-option field may be used within a DIO to carry codes specifying a particular objective function (OF) to be used for building the associated DAG.

Figure 4:
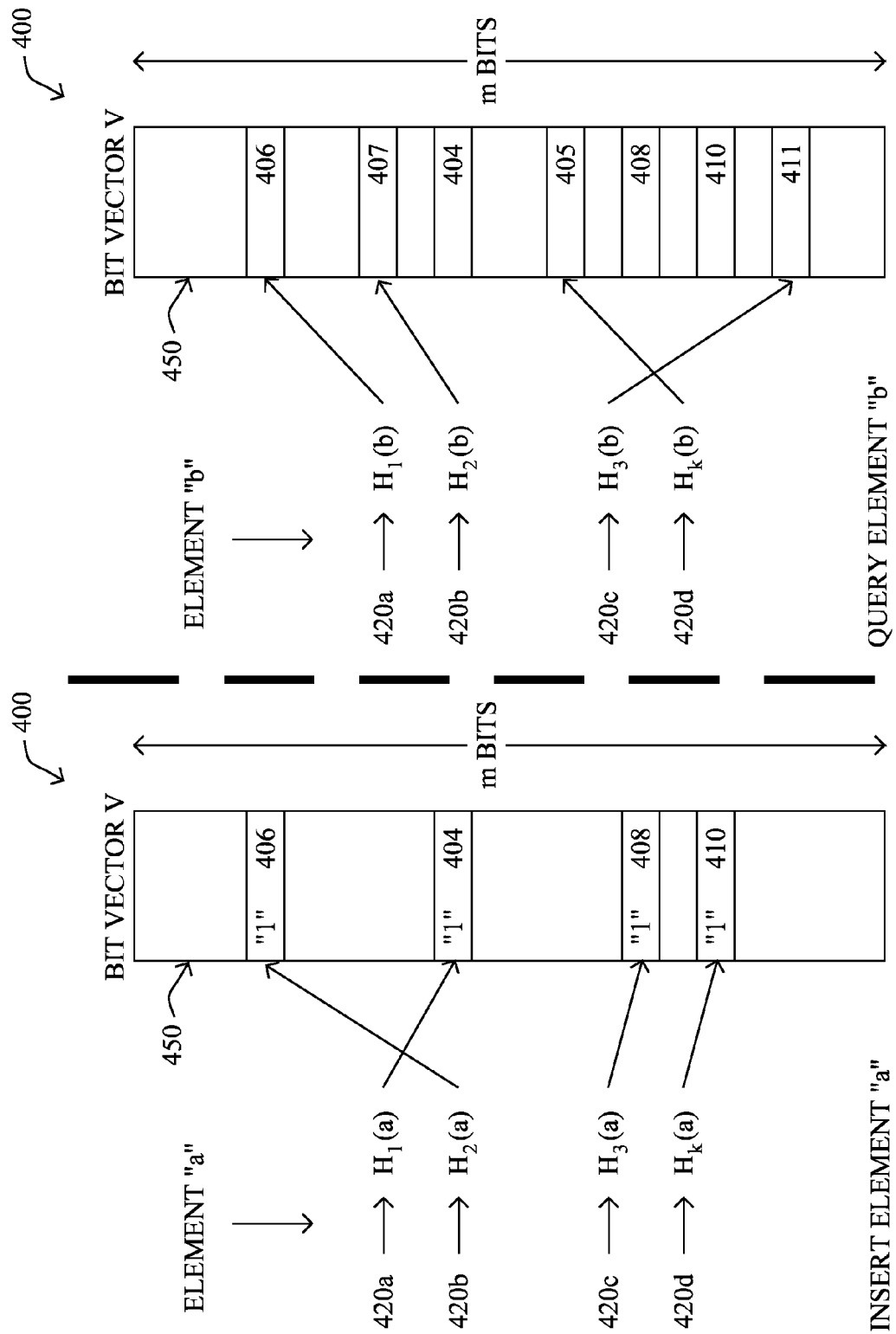
FIG. 4 illustrates an example Bloom filter.

With reference now to FIG. 4, illustrated is an example of a Bloom filter 400 with four hash functions 420a-420d. As understood by one skilled in the art, Bloom filter 400 allocates a vector v of m bits, initially all set to 0, and then choose k independent hash functions, h1, h2, . . . , hk, each with range {1, . . . , m}. Bloom filter 400 is shown implemented with a multi-ported memory 450, where the memory 450 has k ports. In this manner, the k array positions 404, 406, 408, 410 of the memory 450 may be written or queried in parallel.

The left-hand side of FIG. 4 illustrates insertion of an element (a) into a set (A). To insert an element a member A, the bits (404, 406, 408, 410, respectively) at positions h1(a), h2(a), . . . , hk(a) in v are set to "1". (A particular bit might be set to "1" multiple times). It should be understood that "1" or "true" as used herein is not intended to be limited to any particular value. For at least one embodiment, the value "1" is implemented as a one-bit logic-high value. However, this example embodiment should not be taken to be limiting. Instead, for alternative embodiments the "1" value may be a logic-low value or may be a multi-bit value.

The right-hand side of FIG. 4 illustrates a query to determine if an element (b) is a member of the set (A). FIG. 4 illustrates that, to query for an element (to test if it is in set A), the element is fed into each of the k hash functions, resulting in k bit positions. Given a query for b, the bits (406, 407, 411, 405, respectively) at positions h1(b), h2(b), . . . , hk(b) are checked. Again, because the Bloom filter 400 illustrated in FIG. 4 is implemented with a k-ported memory 450, the k array positions (positions h1(b), h2(b), . . . , hk(b)) may be checked in parallel.

If any of the bits is "0", then b is not in the set A. (If the element were in the set, then presumably all such bits would have been set to "1" when the element was added to the set). Otherwise, if all bits are "1", then either the element is in the set, or the bits have been set to "1" during the insertion of other elements. Thus, if all bits are set to "1", it may be assumed that b is in the set although there is a certain probability that this is not true (because the bits may have been set during the insertion of other elements). The (relatively rare) case in which the bits are set for the insertion of other elements, is called a "false positive" or "false drop", when the query erroneously indicates membership in the set for element b.

In summary, a Bloom filter is a space-efficient probabilistic data structure that is used to test whether an element is a member of a set. Typically, an empty Bloom filter is a bit-vector of m bits, all set to 0 wherein there is k different hash functions defined, each of which maps an element to one of the m array positions with a uniform random distribution. To add an element to the Bloom filter, feed it to each of the k hash functions to get k array positions and set them to 1. To test whether an element is in the set, feed it to each of the k hash functions to get k array positions. If any are 0, then the element is not in the set. If all are 1, then either the element is in the set or may indicate a false positive. Again, false positives are possible, but false negatives are not. The bit-vector size depends on the number of inserted elements and desired false positive rate. For instance, a typically Bloom filters uses $1.44*\log_2(1/r)$ bits of space per element, where r is the false positive rate of the Bloom filter. For example, to support r<1%, the Bloom filter requires 10 bits (1.25 bytes) per element. To support r<0.1%, the Bloom filter requires 15 bits (1.875 bytes) per element.

Illustratively, the techniques described herein may be performed by hardware, software, and/or firmware, such as in accordance with the topology management process 248, which may contain computer executable instructions executed by the processor 220 (or independent processor of interfaces 210) to perform functions relating to the techniques described herein, e.g., in conjunction with routing process 244 (and/or DAG process 246). For example, the techniques herein may be treated as extensions to conventional protocols, such as the one or more routing protocols (e.g., RPL) or other communication protocols, and as such, may be processed by similar components understood in the art that execute those protocols, accordingly.

It is to be appreciated that even though Bloom filters were developed with focus on the database community, Bloom filters have also been applied to networking in the areas of distributed caching, P2P networking, routing, and management. It is further to be appreciated that existing record route mechanisms all rely on a list of node identifiers that name the set of nodes and their relative order. In this regard, and preferably under the control of process 244 (FIG. 2), and in accordance with an illustrated embodiment, operationally, a Bloom filter is utilized and operative to compact data packet record route entries and allow recording arbitrary length record routes with a given fixed header size. Therefore, with only 1-2 bytes per entry (vs. 16 bytes per entry), Bloom filters significantly reduce the record route overhead. By operating on a fixed-size data structure, routers along the path of a computer network, such as an LLN, can continue to record information about the path even if the source did not correctly estimate the path length. It is to be understood encoding a signal includes maintaining a Bloom filter within the data packet itself which preferably encodes the identifier of each device along the signal path and their nodal hop counts.

With the configuration and functionality of Bloom filters provided above, it is noted that as more experience is acquired via the above mentioned RFC 6550 proposed standard, a non-storing mode problem has been identified regarding source route generation at the DAG root. When in a non-storing mode, RPL routers are responsible for sending DAO messages to the DAG root which DAO messages indicate the DAG parent(s) of the RPL router. With knowledge of the DAG topology, the DAG root can generate a source route from itself to each individual node. Thus, a problem exists in that the DAG root must have received a DAO from every RPL router along a path towards the destination before it can build a source route. For instance, and with returning reference to FIG. 1, for the signal path (142) LBR→12→22→32→42, the DAG root, LBR, must receive DAO messages from nodal devices 12, 22, 32, and 42 to properly construct a source route to destination nodal device 42. It is to be understood, for constructing an aforesaid source route, it is not sufficient to only receive a single DAO message from destination nodal device D.

One possible solution is to include path accumulation in the DAO message itself. Using path accumulation, nodal routers append their IPv6 address to each DAO message as they forward them towards the root node. As a result, the DAG root receives the entire path the DAO message traversed from the source. By reversing those links, the DAG root can then generate a source route to deliver messages back to the destination nodal device. However, recording an IPv6 Address at each nodal hop in an RPL message is typically too costly for the aforementioned strict resource constraints of LLNs.

Attempts to obviate or mitigate this problem have been proposed and are discussed in commonly assigned U.S. patent application Ser. Nos. 13/563,573 & 13/384,982. For instance, U.S. application Ser. No. 13/563,573 describes encoding the path accumulation (record route) in a compact format using Bloom filters. As mentioned above, rather than requiring 16 bytes per hop for IPv6 address, the Bloom filter requires only 1-2 bytes per hop. This significant cost reduction makes path accumulation feasible for RPL messages. The DAG root thus obtains a Bloom filter encoding of the path, rather than a list of IPv6 addresses. Hence, one method to generate a source route is by inclusion of a Bloom filter within the data packet message itself wherein each nodal hop along the message nodal path determines what nodal neighbors return a positive query for the Bloom filter so as to forward the data packet message to those neighboring nodal devices.

However, a noted drawback in using Bloom filters for routing is the occurrence of false positives. Regardless of the forwarding strategy (e.g., send a copy to all neighbors that returns a positive query simultaneously or try a single neighbor at a time with backtracking), false positives create added overhead in the path accumulation of the DAO message (e.g., channel utilization, latency, energy consumption). This occurrence leads to a tradeoff between the size of the Bloom filter contained in DAO messages and the source route vs. the false positive rate. For example, a 1% false positive rate requires 10 bits per hop. A 0.1% false positive rate requires 15 bits per hop. Depending on the application requirements, the added overhead at every nodal hop may or may not be acceptable.

The illustrated embodiments herein provide a hybrid method for using deterministic source routes (e.g., list of IPv6 addresses) with probabilistic source routes (e.g., Bloom filter) while managing the cost/benefit tradeoffs. This method may be used to solve the downward routing problem with RPL messages when DAO messages are not received from all nodes along a path. Thus, it solves the problem when DAO messages are not received from all nodal messages along a nodal path whereby not receiving such a DAO message often leads to an incomplete, or unusual, signal route which consequently causes a lack of connectivity of nodal devices along a nodal path for a data packet message. That is, the source nodal device may rely on the Bloom filter in attempt to reduce the size of the source route header (e.g., by omitting explicit identifiers). The source nodal device may also rely on the Bloom filter whenever it does not know the explicit identifier for some portion(s) of a signal nodal path. As mentioned above, if a single DAO message is not received from a node along the signal path, the DAG root cannot complete the source route. Hence by using a Bloom filter to provide compact signal path information in every DAO message, the DAG root can utilize the Bloom filter information as part of the source route.

It is to be understood and appreciated that while the below illustrated embodiments are described in conjunction with RPL messaging protocols, their techniques may be applied to other tree/DAG-based routing messaging protocols and thus are not to be limited to RPL messaging protocols. For instance, the below illustrated embodiments may be used in conjunction with routing protocols such as link state protocols (OSPF, ISIS) where the size of the Link State Advertisement (LSA) message in highly dense environments having a large number of routing adjacency may be problematic.

Figure 5:
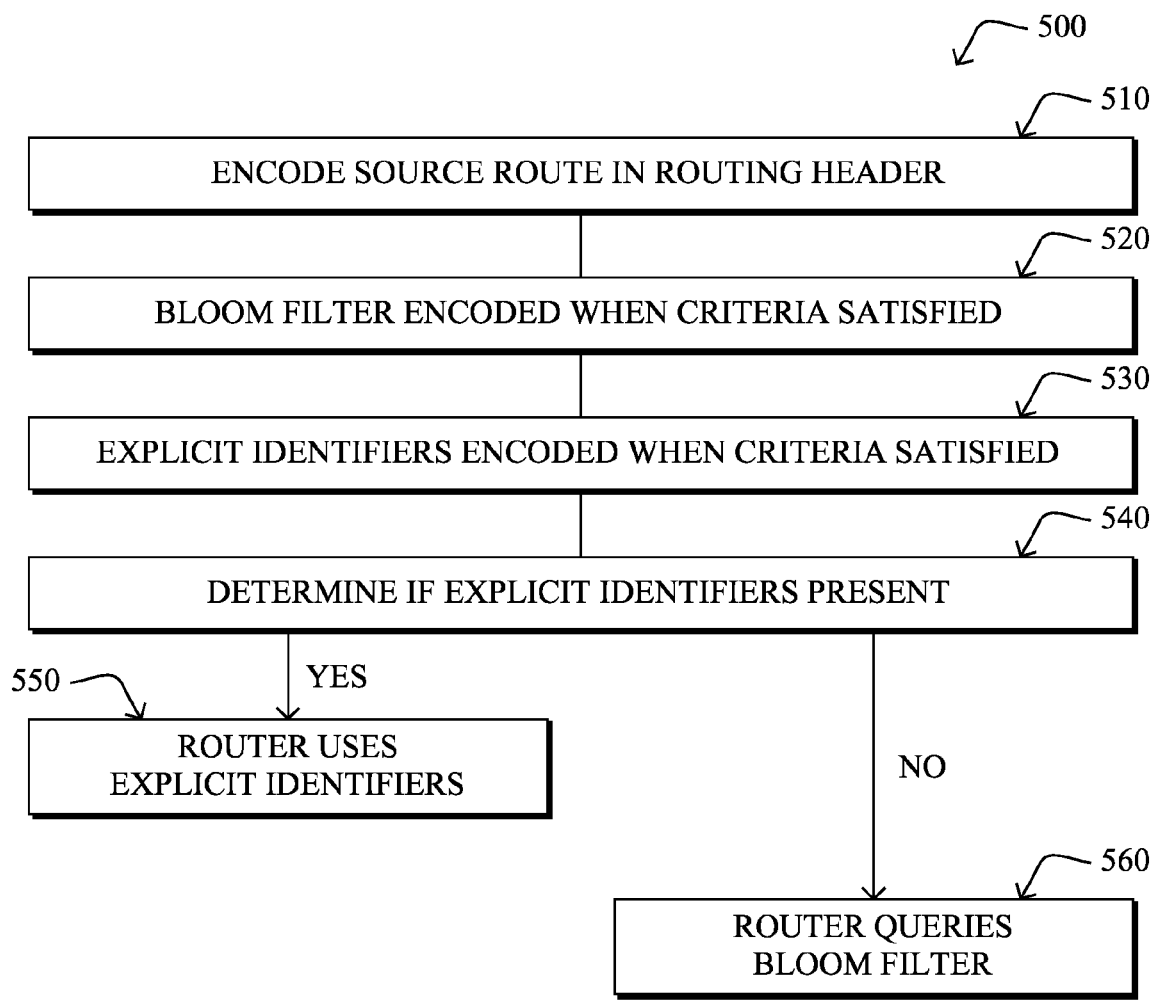
FIGS. 5 and 6 illustrate example simplified procedures for routing data packet messages with a signal routing header having deterministic and probabilistic source routes.

With reference now to the illustrated embodiment of FIG. 5, shown is a simplified procedure 500, via process 244 (FIG. 2), for reducing the record route overhead of communicating downward routing state information using a hybrid of deterministic and probabilistic source routing techniques including Bloom filters in RPL messages or other similar tree/DAG-based routing protocols involving reporting both reachable IPv6 addresses and parent nodes of a source node. Thus what is described is a hybrid approach to using Bloom Filters for path accumulation whereby rather than only using a Bloom Filter to encode an entire source route of a nodal path, explicit identifiers may be used for at least a subset of the nodal path. As will be appreciated, this enables the source route to utilize both deterministic identifiers (e.g., IPv6 addresses) and probabilistic identifiers (e.g., Bloom Filters) on a per nodal hop basis. Hence, this permits the source nodal device to determine the cost of false positives attributable to probabilistic identifiers versus signal overhead attributable to deterministic identifiers.

It is to be understood a deterministic identifier is one that uniquely identifies a node/interface (e.g., IPv6 Address). A probabilistic identifier is one that will identify the intended node/interface, but with some false-positive rate (e.g., Bloom filters). As mentioned above, when using Bloom filters, false-positives are possible, but false-negatives are not. In other words, Bloom filters will never fail to identify the intended node/interface but may identify additional nodes/interfaces as being the same. It is noted that false positives may be filtered out by correlating with information with other inputs such as the routing topology when available, or the known neighbor discovery (ND) protocol.

In accordance with an illustrated embodiment, when using IPv6 addressing information, the source route may be encoded as an IPv6 Routing header including the following fields (step 510):
  1) Path Length: the number of entries in the source route.
  2) Current Position: incremented by each router along the path.
  3) Bloom Filter K: number of hash functions used for the Bloom filter.
  4) Bloom Filter Bit-Vector: used to encode (Hop Count I Identifier) entries
  5) Explicit Identifiers[N]: a list of (Hop Count, Identifier) tuples.

Entries are encoded using a Bloom filter in the source route when the estimated cost of false positives is below a threshold (step 520). Conversely, the entries are encoded in the source route using Explicit Identifiers when the estimated cost of false positives is above a threshold (step 530). In one embodiment, the DAG root may generate the source route information using deterministic and/or probabilistic source route identifiers by iterating through the list of identifiers for the signal path. Using signal path topology information (e.g., from RPL), the DAG root may determine the number of nodes at a particular nodal hop and estimate the cost of false positives at each nodal hop (step 520). In another embodiment, the DAG root may use an explicit identifier every N'th nodal hop to limit the scope of false positives (step 530). In yet another embodiment, the computer network may generate the source route information by providing Path Accumulation/Record Route functionality with a Bloom filter.

Thus, when forwarding a packet with the aforesaid source route having deterministic and/or probabilistic source route identifiers, a nodal routing device first determines if an Explicit Identifier exists for the next hop (step 540). If yes, the router uses the Explicit Identifier for the next hop (step 550). If no (step 540), the router queries the Bloom filter for each of its neighbors using the (Hop Count|Identifier) key and forwards the data packet message to any neighbor that returns a positive query (step 560). Hence, depending on the forwarding strategy, a nodal device may forward to all neighbors that return a positive query simultaneously, or try one at a time with some backtracking. Alternative to the router querying the Bloom filter for each of its neighbor nodes (step 540), a reduction in the search space for seeking a next hop node can be achieved when a router knows its "children nodes" with a certain DAG topology, thus the router merely queries its children nodes as opposed to all neighboring nodes for determining a next hop node.

Figure 6:
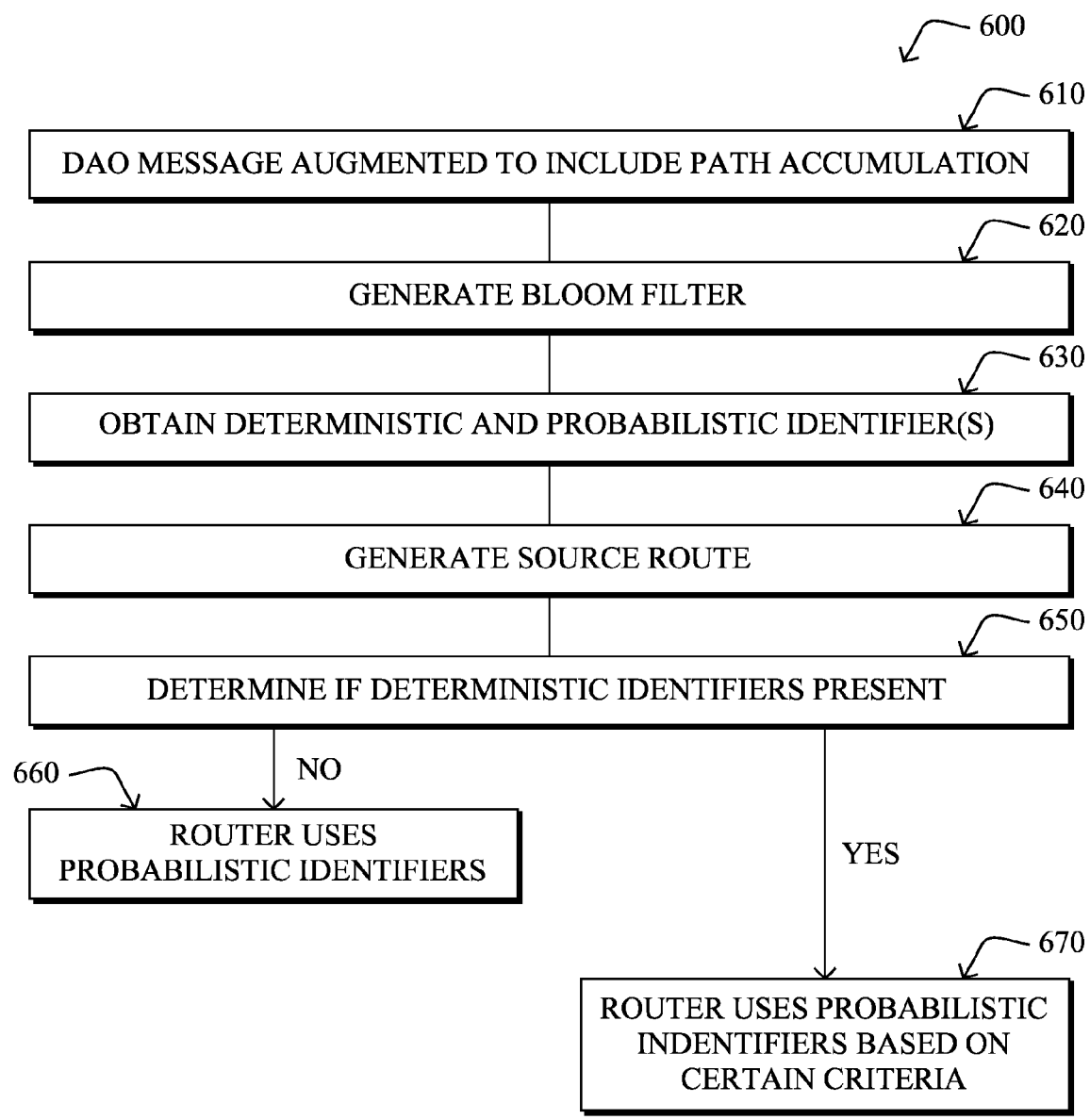

With the above simplified procedure 500 for encoding a routing signal using deterministic and/or probabilistic source route identifiers being described above, reference is now made to FIG. 6 which illustrates is a simplified procedure 600 for routing RPL data packet messages with a routing header having deterministic and/or probabilistic source route identifiers for improving the RPL routing protocol (or any other routing protocol that relies on source routes).

First, an RPL DAO message is augmented to include Path Accumulation using Bloom filters as mentioned and described above (step 610). The included Path Accumulation preferably generates a Bloom filter for each nodal hop along the nodal signal path (step 620). Using the augmented DAO messages, the DAG root next obtains the deterministic identifier for the DAG parent and the probabilistic identifier for each node along the path for each DAO message (step 630). The DAG root can then use the combination of deterministic and probabilistic identifiers when generating a source route towards a destination node (step 640). When routing a data packet message, and after a determination has been made whether deterministic identifiers are included in the signal routing header (step 650), the DAG root uses the probabilistic identifiers when it is determined a deterministic identifier does not exist for a destination node (step 660). Furthermore, the DAG root may choose whether or not to use probabilistic identifiers even if it does have deterministic identifiers based on certain criteria, as explained further below (step 670).

In one illustrated embodiment, the DAG root uses deterministic identifiers whenever possible (step 670) since each use of the Bloom filter may introduce additional overhead due to false-positives, thus the DAG root minimizes false-positive occurrences by including available Explicit Identifiers. It is to be understood that when the DAG root knows the Identifiers for all devices along the path (the number of Explicit Identifiers equals the number of nodal hops) the Bloom filter may be omitted from the source route of the routing header of the data packet message. Conversely in the event the DAG root does not know one or more Identifiers along the path (due to dropped DAO messages), the DAG root includes the Bloom filter in the source route. For example, when the source router knows the identifier of each nodal hop along a signal path, it generates a source route that does not include the Bloom filter and lists each identifier in the Explicit Identifier list. However, when the source router does not know the identifier of at least one or more of the nodal hops along the signal path, it generates a source route header that includes the Bloom filter while also listing each identifier it knows in the Explicit Identifier list in the source route header.

In another illustrated embodiment, the DAG root may attempt to exclude as many Explicit Identifiers as possible to reduce the overhead of the signal route header (step 670). As noted above, the tradeoff is that relying on the Bloom filter may incur additional overhead as false-positives may cause the data packet message (or copies of the data packet message) to be forwarded along an incorrect nodal link/path. Thus, the DAG root determines this cost-benefit tradeoff of relying on the Bloom filter to forward the data packet message. In yet another embodiment, the DAG root relies on the Bloom filter towards the end of a signal path (step 670), since the cost of forwarding along an incorrect link/path is limited to the last few nodal hops. In another embodiment, the DAG root relies on the Bloom filter for nodal devices that have few neighbors (step 670), since the expected number of false-positives is small in this instance. In yet another embodiment, the DAG root may include Explicit Identifiers every N nodal hops (where N is an integer) (step 670) to limit the extent of false-positives attributable to use of a Bloom filter.

For example, when the DAG root determines the cost of false-positives attributable to use of a Bloom filter is minimal at every nodal hop along a signal path, the source router generates a source route header that only includes the Bloom filter and does not include an Explicit Identifier list. Conversely, when the DAG root determines the cost of false-positives attributable to use of a Bloom filter is high at certain nodal hops along a signal path, the source router generates a source route header that includes a Bloom filter and at least some entries in the Explicit Identifier list corresponding to those nodal hops having a determined high cost if reliance on a Bloom filter was used.

In yet another embodiment, the DAG root may obtain feedback about the number of false positives that may occur attributable to use of a Bloom filter. While the DAG root has some knowledge about the signal routing topology, it may not have complete visibility and thus cannot determine the actual rate of false positives without some feedback. Thus in this embodiment, routing devices may provide feedback to the DAG root when false positives occur (indicated by having multiple next-hop possibilities that return a positive query in the Bloom filter). The DAG root may then adjust whether to use the Bloom filter or Explicit Identifiers based on the desired false positive rate (step 670).

With certain illustrated embodiment being described above, it is to be appreciated that by including Bloom-filter based Path Accumulation in DAO messages, the DAG root can now use a hybrid source route having deterministic and probabilistic source routes to specify a signal path even in the event when the DAG root has not received DAO messages from certain nodes along a signal path. Additionally, by using a hybrid source route having deterministic and probabilistic source routes, the DAG root may determine a cost-benefit tradeoff between the compact nature of probabilistic identifiers vs. the added overhead that false-positives may cause from their use. Thus the above described hybrid source route using deterministic and probabilistic source routes obviates the above mentioned downward routing problem with RPL messages when DAO messages are not received from all nodes along a path.

Additionally, the techniques described herein in accordance with the illustrated embodiments provide a significant reduction for the cost of communicating parent set information to the DAG Root. Generally this is because a Bloom filter requires significantly less overhead per parent identifier in contrast the overhead required by IPv6 addresses. Since DAO messages represent the vast majority of control message overhead, especially in non-storing mode, they must convey the entire routing topology to the DAG Root. Thus, the above described illustrated embodiments are advantageous in reducing a significant cause of control message overhead.

It is to be appreciated that while certain steps within procedures 500 and 600 may be optional as described above, the steps shown in FIGS. 5 and 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for encoding bloom filters in a data packet to implement control plane mechanisms in a compact format, it is to be understood that various other adaptations and modifications may be made within the spirit and scope of the embodiments herein. For example, the embodiments have been shown and described herein with relation to LLN networks, and, in particular, the RPL protocol. However, the embodiments in their broader sense are not as limited, and may, in fact, be used with other types of networks and/or protocols.

The foregoing description has been directed to specific illustrated embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
providing a message having a routing header configured to accommodate both a deterministic source route and a probabilistic source route for encoding a nodal source route for the message in a computer network; and
selectively encoding the nodal source route with one or both of a deterministic source route and a probabilistic source route based upon one or more predetermined criteria, wherein the nodal source route is encoded with a deterministic source route when it is determined an estimated cost of false positives attributable to a Bloom filter is above a certain threshold.

2. The method of claim 1 wherein the deterministic source route includes an IPv6 address.

3. The method of claim 1 wherein the routing header includes one or more of the following fields:
(a) a path length field indicative of the number of entries of the source route;
(b) a current position field which is incremented by each router of a nodal path;
(c) a Bloom filter integer K indicative of the number of hash functions to use for the Bloom filter; and
(d) a Bloom filter bit-vector field for encoding a Bloom filter.

4. The method of claim 1 wherein the probabilistic source route includes a bloom filter.

5. The method of claim 1 wherein the selectively encoding step includes encoding the nodal source route with a Bloom filter when it is determined an estimated cost of false positives attributable to a Bloom filter is below a certain threshold.

6. The method of claim 1 wherein the message having the router header is a proactive routing protocol advertisement message.

7. A method, comprising:
receiving a message in a computer network having a routing header configured to accommodate both a deterministic source route and a probabilistic source route for encoding a nodal source route for the message;
determining whether the message has a deterministic source route in the route header;
in response to the message not having a deterministic source route, interpolating a probabilistic source route and forwarding the message based on the interpolation, wherein the probabilistic source route includes a Bloom filter; and
in response to the message having a deterministic source route for all nodal devices along a nodal path, eliminating the Bloom filter from the routing header and forwarding the message according to the deterministic source route.

8. The method of claim 7 further comprising the step of forwarding the message according to the probabilistic source route in response to instructions to eliminate deterministic explicit identifiers from a deterministic source route in the routing header to reduce signal overhead.

9. The method of claim 7 further comprising the step of forwarding the message according to the probabilistic source route when the message is near an end portion of a nodal path in the computer network.

10. The method of claim 7 further comprising the step of forwarding the message according to the probabilistic source route when a number of neighboring nodal devices is below a threshold.

11. The method of claim 7 further comprising the step of forwarding the message according to the probabilistic source route conditional upon feedback regarding the occurrence of false positives attributable to a Bloom filter provided in the probabilistic source route.

12. The method of claim 7 further comprising the step of including an explicit identifier in the deterministic source route in the routing header every Nth nodal hop of the message along a signal nodal path where N is an integer.

13. The method of claim 7 further comprising the step of determining if a deterministic source route includes an explicit identifier for a next message route hop, and if yes, use the determined explicit identifier for forwarding message along the next message route hop.

14. The method of claim 7 further comprising the step of querying a Bloom filter present in probabilistic source route for each neighbor node along the nodal path for forwarding the message along the nodal path if it is determined the deterministic source route does not include an explicit identifier for a next signal route hop along the nodal path.

15. The method of claim 7 wherein the message having the router header is a proactive routing protocol advertisement message.

16. An apparatus, comprising:
one or more network interfaces to communicate with a computer network;
a processor coupled to the network interfaces and adapted to execute one or more processes; and
a memory configured to store a process executable by the processor, the process when executed operable to:
provide a message having a routing header configured to accommodate both a deterministic source route and a probabilistic source route for encoding a nodal source route for the message in the computer network; and
selectively encode the nodal source route with one or both of a deterministic source route and a probabilistic source route based upon one or more predetermined criteria;
wherein the processor is operative to encode the nodal source route with a deterministic source route when it is determined an estimated cost of false positives attributable to a Bloom filter is above a certain threshold.

17. The apparatus as in claim 16, wherein the deterministic source route includes an IPv6 address and the probabilistic source route includes a Bloom filter.

18. The apparatus as in claim 16, wherein the processor is operative to encode the nodal source route with a Bloom filter when it is determined an estimated cost of false positives attributable to a Bloom filter is below a certain threshold.

19. An apparatus, comprising:
one or more network interfaces to communicate with a computer network;
a processor coupled to the network interfaces and adapted to execute one or more processes; and
a memory configured to store a process executable by the processor, the process when executed operable to:
receive a message in the computer network having a routing header configured to accommodate both a deterministic source route and a probabilistic source route for encoding a nodal source route for the message;
determine whether the message has a deterministic source route in the routing header; and
in response to the received message not having a deterministic source route, interpolate a probabilistic source route and forwarding the message based on the interpolation,
wherein in response to the received message having a deterministic source route for all nodal devices along a nodal path, the processor is configured to eliminate the Bloom filter from the routing header and forward the message according to the deterministic source route.

* * * * *